Inventors
FRANK H. BOESCHE,
LESLIE D. STAVER,
PERCY LEROY GRIFFITH,

By [signature]
Attorney

Oct. 16, 1951     F. H. BOESCHE ET AL     2,571,821
BRAKE CONTROL SYSTEM
Filed Jan. 5, 1948
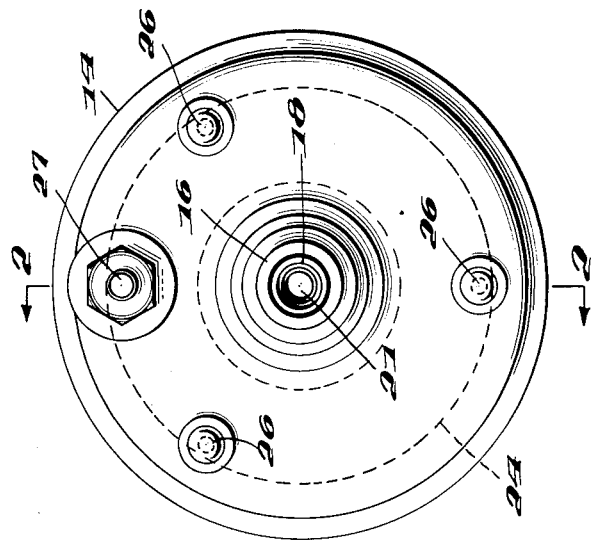
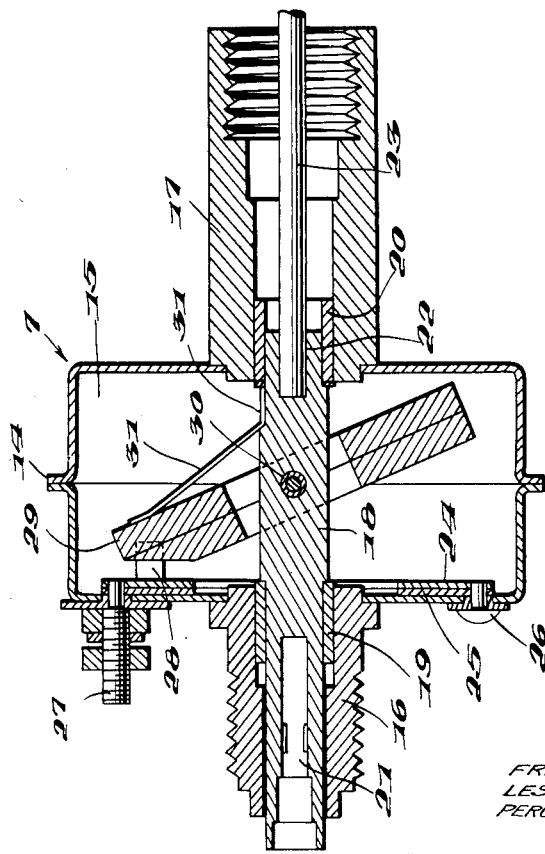
Inventors
FRANK H. BOESCHE,
LESLIE D. STAVER,
PERCY LEROY GRIFFITH, Patented Oct. 16, 1951

2,571,821

UNITED STATES PATENT OFFICE 2,571,821

BRAKE CONTROL SYSTEM

Frank H. Boesche and Leslie D. Staver, Washington, D. C., and Percy Le Roy Griffith, Montclair, N. J., assignors to Brake-Trol Corporation, Washington, D. C., a corporation of Delaware Application January 5, 1948, Serial No. 492

8 Claims. (Cl. 200—80)

This invention relates to improvements in brake control systems particularly of the character where brakes are operated hydraulically.

One object of this invention is to improve the control of the hydraulic brakes and to provide an efficient and effective means for holding the brakes applied when the vehicle is at rest and for releasing the brakes automatically upon forward movement of the vehicle.

Another object of the invention is to improve the construction of a circuit breaker to enable this to be operated automatically by the accelerator of the vehicle to control the operation of the hydraulic brake system, whereby a simple and effective circuit breaker is provided which may be installed simply and is not expensive to construct and use.

These objects may be accomplished according to one embodiment of the invention by using a switch mounted for shifting movement to open and close an electric circuit for controlling the brake system, which switch operates in response to the position of the accelerator pedal of the vehicle, being tilted to one position when the pedal is released and moved to its other position when the pedal is depressed, the switch swinging to one position in opposition to the action of the accelerator pedal.

This embodiment is illustrated in the accompanying drawings in which:

Fig. 2 is a cross section through one of the switches, on the line 2—2 in Fig. 3; and Fig. 3 is a side elevation thereof.

Figure 1:
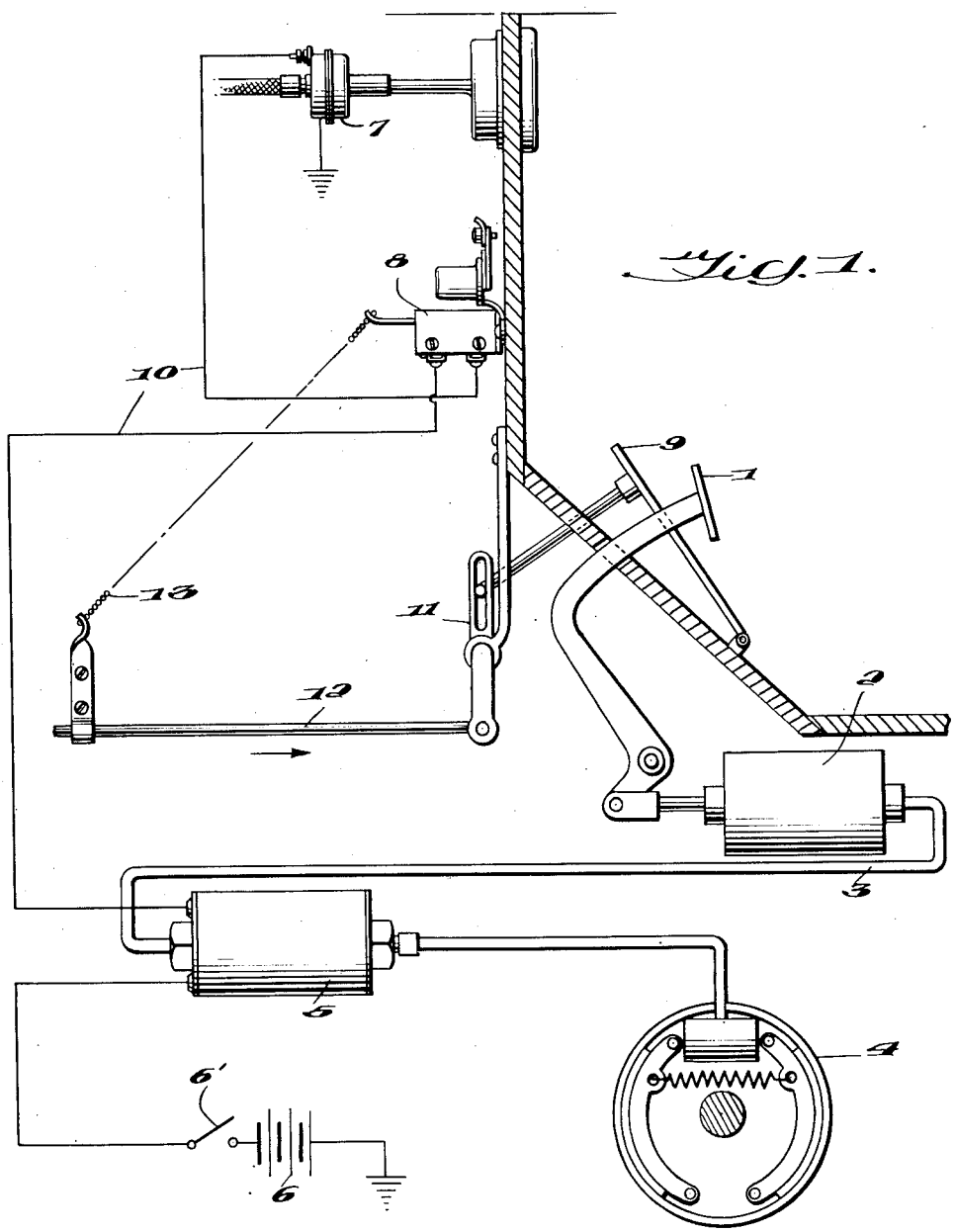
Fig. 1 is a diagrammatic side elevation, partly in section, showing an application of the switch in a brake control system.

In the brake control system illustrated in Fig. 1, the usual foot brake pedal is designated generally by the numeral 1 for applying pressure in a master cylinder 2 of a hydraulic brake system, which pressure is communicated through a line 3 to a hydraulic wheel brake 4, the structure of which is well known, and need not be described in detail. When the brake pedal 1 is depressed, the hydraulic fluid pressure travels from the master cylinder 2 through the line 3 to the hydraulic power device that controls the brake shoes of the wheel brake 4 to expand the shoes and cause braking action on the wheel.

Connected in the line 3 is a solenoid-actuated valve 5 adapted to be energized by a battery 6 which may be the usual battery of an automobile when the invention is used in the application illustrated. As shown in Fig. 1, the energizing of the solenoid valve 5 is controlled automatically by switch devices illustrated generally at 7 and 8. The switch device 7 normally is closed when the vehicle is at rest, but is actuated by the speedometer cable in the example illustrated to break the circuit to the valve 5 immediately upon the starting in motion of the vehicle, or when the vehicle reaches a predetermined speed, as for instance, in excess of two miles per hour as one example.

The switch 8 normally is closed when the engine is idling but is adapted to be actuated by an accelerator pedal 9 of the motor vehicle, whereby the depressing of the pedal 9 will break the circuit indicated at 10 that connects the switches 7 and 8 and the battery 6 with the solenoid-actuated valve 5. The accelerator pedal 9 is shown as operatively connected with a lever 11 from which a rod 12 forms the usual connection therefrom to the carburetor. In the example illustrated, the rod 12 has a flexible connection 13 with the switch 8 normally tending to release the switch to close the circuit when the accelerator pedal 9 is released.

The structure of the switch or circuit breaker 7 is shown more in detail in Figs. 2 and 3.

In the form illustrated, the circuit breaker 7 includes a housing 14 shown as formed in two parts rigidly secured together and enclosing a chamber 15 therein. On one side of the housing 14 is secured a coupling 16 adapted to receive one end of the speedometer cable cover, while a similar coupling 17 is adapted to receive another section of the speedometer cable cover, having provision for screw connection with these sections. The coupling 17 is secured to the opposite side of the housing 14.

A shaft 18 extends through the housing 14 and through the couplings 16 and 17, being journaled in bearings 19 and 20 therein. At one end the shaft 18 has a socket 21 adapted to be connected with the speedometer cable and the opposite end of the shaft 18 has a socket 22 for connection with a section of the cable, as indicated at 23.

Mounted on a side wall of the housing 14 is an annular contact plate 24 insulated from the wall by an insulator plate 25 interposed therebetween and held in place by rivets or other suitable fastenings 26. The contact plate is connected also with the binding post, generally indicated at 27, which forms a terminal for connection in the electric circuit 10.

The contact plate 24 is in position to be engaged by brush contact 28 carried on one side of a rotor disc or ring 29. The rotor disc 29 is of annular form and receives the shaft 18 through the center opening thereof, being pivoted thereto by a pin 30, so as to swing freely relative to the shaft 18 while rotating therewith. A leaf spring 31 has one end bearing against a side face of the rotor disc 29 while the opposite end is shown at 31 fixed to the periphery of the shaft 18. The leaf spring 31 normally tends to swing the rotor disc 29 on the pin 30 to the position shown in Fig. 2, with the contact 28 in engagement with the contact plate 24, when the speedometer cable is substantially at rest. However, upon rotation of the speedometer cable by the movement of the vehicle, the centrifugal force acting on the rotor disc 29 tends to swing this disc to a position with the contact 28 out of engagement with the contact plate 24. The construction may be so balanced that such disengagement is achieved at relatively slow movement of the vehicle, as for instance, two miles per hour. The only force that affects the rotor disc or ring 29 tending to move it away from its circuit closing position is the centrifugal force resulting from the rotation of the shaft 18 about its own axis. Accelerating forces or gravity do not affect the rotor ring 29 because of its mounting on its center of gravity.

It will be evident from the above that the circuit 10 will be closed as described to energize the solenoid-operated valve 5 and close the valve as soon as the vehicle has been brought to rest, thus holding the brake 4 applied until this circuit is broken either at the switch 8 or at the switch 7. The latter is controlled by the movement of the vehicle and the switch 8 will not be opened until the accelerator pedal 9 has been actuated for operation of the engine. Upon depressing movement of the accelerator pedal, the rod 12 will move in the direction indicated by the arrow in Fig. 1 for opening the switch 8, thereby breaking the circuit 10 and releasing the solenoid-actuated switch 5. As soon as the vehicle has been moved to the required extent, the switch 7 will be opened by the action of the speedometer cable thereby maintaining the circuit 10 open until the vehicle again is brought to rest.

The character of the solenoid-actuated valve 5 is described more in detail in an accompanying application while the switch 8 may be of any suitable or desired character which will function as described.

While the invention has been illustrated and described in one embodiment, it is recognized that variations and changes may be made therein without departing from the invention except as specified in the claims.

We claim:

1. A switch comprising a housing, a shaft journaled in the housing, an annular contact plate carried by the housing, a rotor ring pivotally mounted on the shaft, on an axis transversely of the axis of the shaft in position relative to the ring to overcome the action of gravity thereon, and a contact on said ring in position to engage the contact plate.

2. A switch comprising a housing, a shaft extending through the housing and journaled therein, an annular contact plate secured to one side of the housing, a rotor ring pivotally mounted on the shaft on an axis transversely of the axis of the shaft in position relative to the ring to overcome the action of gravity thereon and having a contact in position to engage the contact plate and a spring bearing against one side of the rotor normally tending to move the rotor to cause engagement of the contact with the contact plate and permitting movement of the contact away from the contact plate upon appreciable rotation of the shaft.

3. A switch comprising a housing, a shaft extending through the housing and journaled therein, an annular contact plate secured to one side of the housing, a rotor ring pivotally mounted on the shaft on an axis transversely of the axis of the shaft on the center of gravity to overcome the action of gravity thereon, a contact on said ring in position to engage the contact plate and a spring bearing against one side of the rotor ring normally tending to move the rotor ring to cause engagement of the contact with the contact plate and permitting movement of the contact away from the contact plate upon appreciable rotation of the shaft.

4. A brake control for a vehicle comprising a rotary speed responsive device for controlling an electrical brake holding means, including a rotor ring having circuit-controlling means connected therewith, a shaft, and means journaling said rotor ring on the shaft on an axis approximately at right angles to the axis of the shaft on the center of gravity of the rotor ring, said rotor ring surrounding the shaft.

5. A brake control for a vehicle comprising a speed responsive device unaffected by gravity adapted to control an electrical brake holding means, said speed responsive device comprising a housing, a shaft journaled in the housing, a contact carried by the housing, a rotor ring surrounding said shaft and pivotally mounted on the shaft on an axis transversely to the axis of the shaft, a contact on said ring in position to engage the contact, and yieldable means urging the ring contact toward the housing contact.

6. A brake control for a vehicle comprising a rotary speed responsive device unaffected by gravity adapted to control an electrical brake holding means, said speed responsive device comprising a housing, a shaft journaled in the housing and adapted to be connected with a speedometer cable for rotation of said shaft, an annular contact plate mounted within said housing, a pin passing through said shaft transversely thereto and spaced from said contact plate, a ring surrounding said shaft and pivotally mounted on said pin, a contact on said ring in position to engage the contact plate, and a spring connected with said ring in position to urge the contact on the ring against the contact plate.

7. A switch for a brake control for a vehicle comprising a housing, a shaft journaled in the housing, an annular contact carried by the housing, a pin mounted transversely through said shaft, a rotor ring surrounding said shaft and pivotally mounted on its axis on said pin, said ring being balanced on said pin whereby it is unaffected by gravity as the shaft rotates, and a contact on said ring in position to engage the housing contact.

8. A switch for a brake control for a vehicle comprising a housing, a shaft journaled in the housing, an annular contact plate carried by the housing, a pin mounted transversely through said shaft, a rotor ring surrounding said shaft and pivotally mounted on its axis on said pin, said ring being balanced on said pin whereby it is unaffected by gravity as the shaft rotates, a contact on said ring in position to engage the contact plate, and a spring fixed to said shaft urging the ring against the contact plate.

FRANK H. BOESCHE.
   LESLIE D. STAVER.
   PERCY LE ROY GRIFFITH.

REFERENCES CITED

The following references are of record in the file of this patent:

UNITED STATES PATENTS

| Number | Name | Date |
|---|---|---|
| 803,339 | Hatherell | Oct. 31, 1905 |
| 1,790,330 | Smith | Jan. 27, 1931 |
| 1,870,896 | Danner | Aug. 9, 1932 |
| 2,235,412 | Weiss et al. | Mar. 18, 1941 |
| 2,263,331 | Field | Nov. 18, 1941 |
| 2,266,213 | Kattwinkel | Dec. 16, 1941 |
| 2,308,822 | Murphy | Jan. 19, 1943 |
| 2,313,430 | Goepfrich | Mar. 9, 1943 |
| 2,334,611 | Darling | Nov. 16, 1943 |

FOREIGN PATENTS

| Number | Country | Date |
|---|---|---|
| 384,954 | Great Britain | Dec. 15, 1932 |